United States Patent [19]

Rabindran et al.

[11] 4,093,376
[45] June 6, 1978

[54] AUTOMATIC EXPOSURE CONTROL

[75] Inventors: Karavattuveetil George Rabindran, Morton Grove; John R. Flint, Barrington, both of Ill.

[73] Assignee: Bell & Howell Company, Chicago, Ill.

[21] Appl. No.: 691,733

[22] Filed: Jun. 1, 1976

[51] Int. Cl.² ............................................. G03B 27/78
[52] U.S. Cl. ...................................... 355/68; 355/69; 250/205
[58] Field of Search .................... 355/67–71, 355/83, 35, 38; 315/158; 250/205, 214 P

[56] References Cited

U.S. PATENT DOCUMENTS

| 3,728,023 | 4/1973 | Stevko et al. | 355/68 |
| 3,775,009 | 11/1973 | Collins | 355/68 |
| 3,947,117 | 3/1976 | Basu et al. | 355/68 |

FOREIGN PATENT DOCUMENTS

| 758,798 | 5/1967 | Canada | 355/83 |

*Primary Examiner*—L. T. Hix
*Assistant Examiner*—W. J. Brady
*Attorney, Agent, or Firm*—Alan B. Samlan

[57] ABSTRACT

The disclosure relates to an automatic exposure control system for use in a document recorder of the type which makes a photographic reproduction of each of a series of documents and which has a document transport for feeding the documents along a predetermined path and an exposure station within the predetermined path including an exposure light source for illuminating each document as each document is presented to the exposure station to facilitate the photographing of the documents. The automatic exposure control system controls the illumination intensity of the exposure light source in response to the reflectivity of each document to assure proper exposure of each document. It includes a first light source arranged relative to the predetermined path in advanced relation to the exposure station relative to document travel for projecting light onto the documents, a first light sensitive element arranged relative to the predetermined path for receiving the light reflected from the documents originating from the first light source for providing a first control signal having a magnitude directly related to the intensity of the reflected light, a feedback arrangement coupled between the first light source and the first light sensitive element for controlling the intensity of the first light source in response to the first control signal to render the intensity of the reflected light received by the first light sensitive element substantially constant, and control means coupled to the exposure light source and responsive to the light output intensity of the first light source for controlling the illumination intensity of the exposure light source as each document is presented to the exposure station.

13 Claims, 6 Drawing Figures

AUTOMATIC EXPOSURE CONTROL

BACKGROUND OF THE INVENTION

The present invention is generally directed to microfilm recording machines and in particular to an improved automatic exposure control system for automatically adjusting the exposure level to assure proper exposure of each document.

Microfilm recording machines are well known. They find various applications, one application for example being in the banking environment for use in processing checks. During the processing of the checks, each check is photographed on both sides simultaneously onto a reel of microfilm which is then immediately processed or processed when a question concerning an individual check is encountered.

Such microfilm recording machines usually include a document transport for transporting the documents over a predetermined path. Within the predetermined path there is an exposure station which includes an exposure light source and camera to facilitate the photographing of each document as each document is presented to the exposure station. Because the documents generally vary in density or reflective properties, it is necessary to adjust the light output intensity of the exposure light source for each document as each document is recorded. Inasmuch as the documents are processed rapidly, automatic exposure control systems have been devised to rapidly vary the exposure level of the documents as they are phtographed.

While prior automatic exposure controls have been generally successful, they have suffered certain deficiencies. One such deficiency is non-uniform exposure of the documents. This results when an automatic exposure control senses the portion of the document that is being exposed and simultaneously adjusts the illumination level of the exposure light source as the document is being photographed. Also, prior automatic exposure controls have been generally slow in responding to changing required light levels when a light document is immediately preceded by a dark document.

It is therefore a general object of the present invention to provide a new and improved exposure level control system for a microfilm recording machine.

It is a further object of the present invention to provide an automatic exposure control for a microfilm recording machine which adjusts for each document being photographed to assure that each document is photographed at the proper exposure level.

It is a still further particular object of the present invention to provide an automatic exposure control system for a microfilm recording machine which assures a constant and proper exposure level for the photographing of each document.

The present invention provides an automatic exposure control system for use in a document recorder of the type having a document transport for feeding documents along a predetermined path, and an exposure station within the predetermined path including an exposure light source for illuminating each document as each document is presented to the exposure station to facilitate the photographing of the documents, for controlling the illumination intensity of the exposure light source to assure proper exposure of each document. The automatic exposure control system comprises a first light source arranged relative to the predetermined path for projecting light onto the documents to be recorded, a first light sensitive element arranged relative to the predetermined path for receiving the light reflected from the documents originating from the first light source, the first light sensitive element providing a first control signal having a magnitude directly related to the intensity of the reflected light, a feedback arrangement coupled between the first light sensitive element and the first light source for controlling the light output intensity of the first light source responsive to the first control signal to render the intensity of the reflected light received by the first light sensitive element substantially constant, and control means coupled between the first light source and the exposure light source for controlling the illumination intensity of the exposure light source in direct relation to the light output intensity of the first light source.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, and in the several figures of which like reference numerals indicate identical elements and in which:

DESCRIPTION OF THE PREFERRED EMBODIMENT

Figure 1:
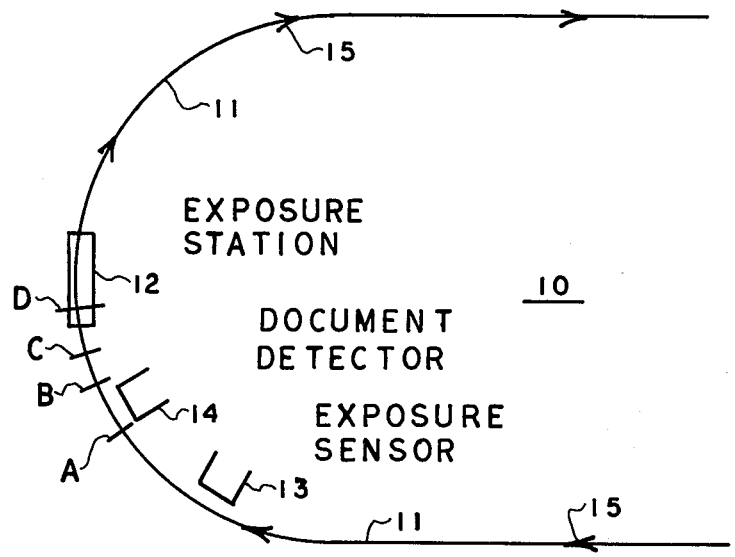
FIG. 1 is a schematic representation of a microfilm recording machine embodying the present invention.

Referring now to FIG. 1, the microfilm recording machine 10 there schematically shown includes a document transport predetermined path 11, an exposure station 12, an exposure sensor 13, and a document detector 14. The documents are transported in the direction of the arrows 15. For details as to the mechanical construction and overall transportation operation of such a microfilm recording machine, reference may be made to U.S. Pat. No. 3,342,100 which issued Sept. 19, 1967 and which is assigned to the assignee of the present invention.

As can be seen in FIG. 1, before being presented to exposure station 12, each document passes by the exposure sensor 13 which senses the density or reflective properties of each document. The exposure sensor, after sensing a sufficient portion of a document, generates a control signal which is indicative of the density of the document. The magnitude of the control signal is directly related to the required illumination intensity required for properly exposing that document.

When the document reaches position A along the predetermined path 11, its presence is detected by document detector 14 which provides a document detection signal. The document detector 14 is coupled to a first timer which is activated by the document detection signal for providing a first transfer signal following the document detection signal. When the document reaches position B the control signal is finished being stored in a first sample and hold circuit. This frees the exposure sensor 13 from having to sense this document further and allows it to sense the next document.

A delay which is also coupled to the document detector 14 and to a second timer is also activated by the document detection signal. After a first predetermined time period following the document detection signal when the document reaches position C, the delay activates the second timer which then provides a second transfer signal. The second transfer signal causes the control signal to be transferred from the first sample and hold circuit to the second sample and hold circuit for a finite timing terminating after a second predetermined time period following the document detection signal to make the control signal readily available for exposure purposes. At this time the document has reached position D along the predetermined path 11 at which position it is assured that the immediately preceding document has completely exited the exposure station 12. Now as the document passes through the exposure station it is exposed at a level commensurate with the control signal.

There may be times in fact when three documents are being processed at the same time. A first document may be just exiting the exposure station while a second document is just about to enter the exposure station and while a third document is being sensed by the exposure sensor. However, because the exposure control signal is transferred from one sample and hold circuit to the other, the exposure sensing of one document may be made without effecting the exposure control signal of the immediately preceding document.

Figure 2:
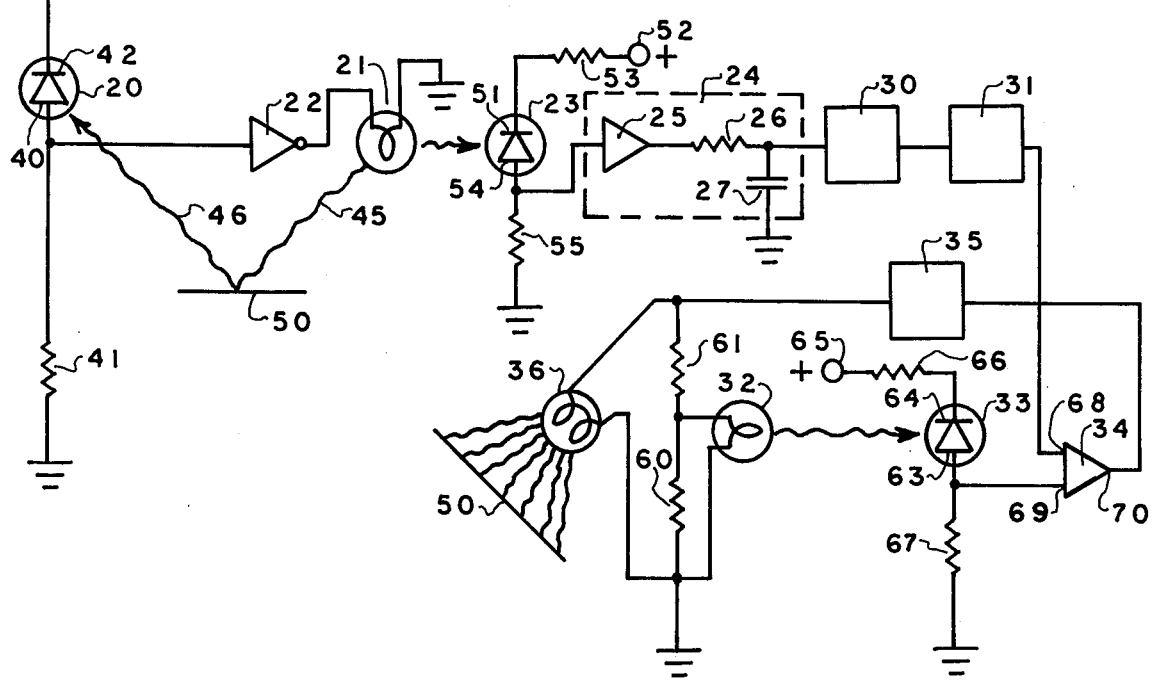
FIG. 2 is a simplified schematic diagram, partly in block form, of an automatic exposure control embodying the present invention.

Referring now to FIG. 2, the automatic exposure control system embodying the present invention there shown comprises an exposure level sensor including light sensive element or photodiode 20, a first light source 21, and a feedback arrangement represented by an inverting amplifier 22. The automatic exposure control system thereshown also comprises a control means including a second light sensitive element or photodiode 23, an averaging means 24 including amplifier 25, resistor 26, and capacitor 27, a first sample and hold circuit 30 and a second sample and hold circuit 31. a monitor light source 32, a monitor light sensitive element or photodiode 33, comparing means or comparator 34, and a variable voltage power source 35 which is coupled to the exposure light source 36 of the microfilm recording machine.

Photodiode 20 has an anode 40 coupled to ground via resistor 41 and a cathode 42 coupled to a positive power terminal 43 via resistor 44. Thus, diode 20 is back biased. The anode 40 of diode 20 is coupled to the light source 21 by the feed back arrangement which is represented by an inverting amplifier 22. The feedback arrangement is coupled to one side of the light source 21 and the other side of light source 21 is coupled to ground.

Light source 21 is arranged relative to the predetermined path 11 for projecting light 45 onto the documents to be recorded such as document 50. The first light sensitive element 20 is arranged relative to the predetermined path for receiving the light 46 reflected from the documents originating from the first light source 21. The first light sensitive element 20 provides a first control signal at anode 40 which has a magnitude directly relayed to the intensity of the reflected light.

The feedback arrangement which is coupled between the diode 20 and light source 21 controls the light output intensity of light source 21 responsive to the first control signal. Because feedback arrangement is a negative feedback arrangement as presented by the inverting amplifier 22, the feedback arrangement will control the intensity of light source 21 such that the intensity of the reflected light 46 received by photodiode 20 will be substantially constant. Thus, for documents of low density and with high reflective properties, light source 21 will be relatively dim and for documents of high density or of low reflective properties, light source 21 will be relatively bright. The second light sensitive element or photodiode 23 has a cathode 51 coupled to a positive power terminal 52 via resistor 53 and an anode 54 coupled to ground via resistor 55. Anode 54 is coupled to the amplifier 25 of averaging means 24. Amplifier 25 is coupled to resistor 26 which is coupled to ground via capacitor 27. Resistor 26 and capacitor 27 are arranged to form an integrater which integrates a second control signal provided by diode 23 at anode 54 in response to the intensity of the light output of light source 21. It in turn provides at the junction of resistor 26 and capacitor 27 a third control signal having a magnitude directly related to the required illumination intensity for properly exposing document 50. Referring to FIG. 1 for a moment, until the document passes by exposure sensor 13 and reaches position A, the density of the document is continuously sensed and the varying brightness of light source 21 is sensed by photodiode 23 which provides the second control signal at anode 54 which is integrated by the averaging means to provide the third control signal.

The first sample and hold circuit 30 and second sample and hold circuit 31 in conjunction with a first timer 200, a delay 250, and a second timer 201 (FIG. 4) delays the application of the third control signal to the comparator 34 until the document reaches position D along the predetermined path. In this position the document is presented to the exposure station and the immediately preceding document has completely exited the exposure station. The first sample and hold circuit 30 receives the third control signal over a finite period of time following the document detection signal provided by the document detector 14. At the end of the finite period of time the document is at position B along the predetermined path and because the third control signal is now stored in the first sample and hold circuit 30, the exposure sensor is freed from further sensing of the document and is thus ready to sense the next document. At the end of a first predetermined time period following the document detection signal when the document is at position C, the third control signal is transferred to the second sample and hold circuit 31. It is fully stored in the second sample and hold circuit at one end of a second predetermined time period following the document detection signal. At this time the document is at position D and is made readily available to the comparator 34.

The control means also includes monitor light source 32 which is coupled across resistor 60 which is in series with resistor 61. Monitor light source 32 therefore provides a light output intensity which is directly related to the light output intensity of the exposure light source 36. The light output intensity of the monitor light source 32 is sensed by photodiode 33 which provides a fourth control signal at anode 63. Photodiode 33 has a cathode 64 coupled to a positive power source terminal 65 by resistor 66 and the cathode 63 is coupled to ground by resistor 67. Thus, photodiode 33 is backbiased and will provide at anode 63 the fourth control signal which has a magnitude directly related to the intensity of the light output of the monitor light source 32. The comparator 34 has an input 68 coupled to the second sample and hold circuit 31 for receiving the third control signal and an input 69 coupled to anode 63 for receiving the fourth control signal. The comparator 34 is responsive to the third and fourth signals to provide a difference signal at output 70 which is impressed upon the variable voltage power source 35.

The difference signal at output 70 represents the difference between the required light output intensity of the exposure light source 36 and the present light output intensity of the exposure light source 36. The difference signal is impressed upon the variable voltage power source 35 and controls the variable voltage power source 35 so that it provides the proper amount of illumination power to exposure light source 36 responsive to the difference signal. When the document reaches position C along the predetermined path 11 the comparator compares the third control signal to the fourth control signal and provides the difference signal which then controls the variable voltage power source 35 and thus the light output intensity of the exposure light source 36 when document 50 is presented to the exposure station.

Figure 3:
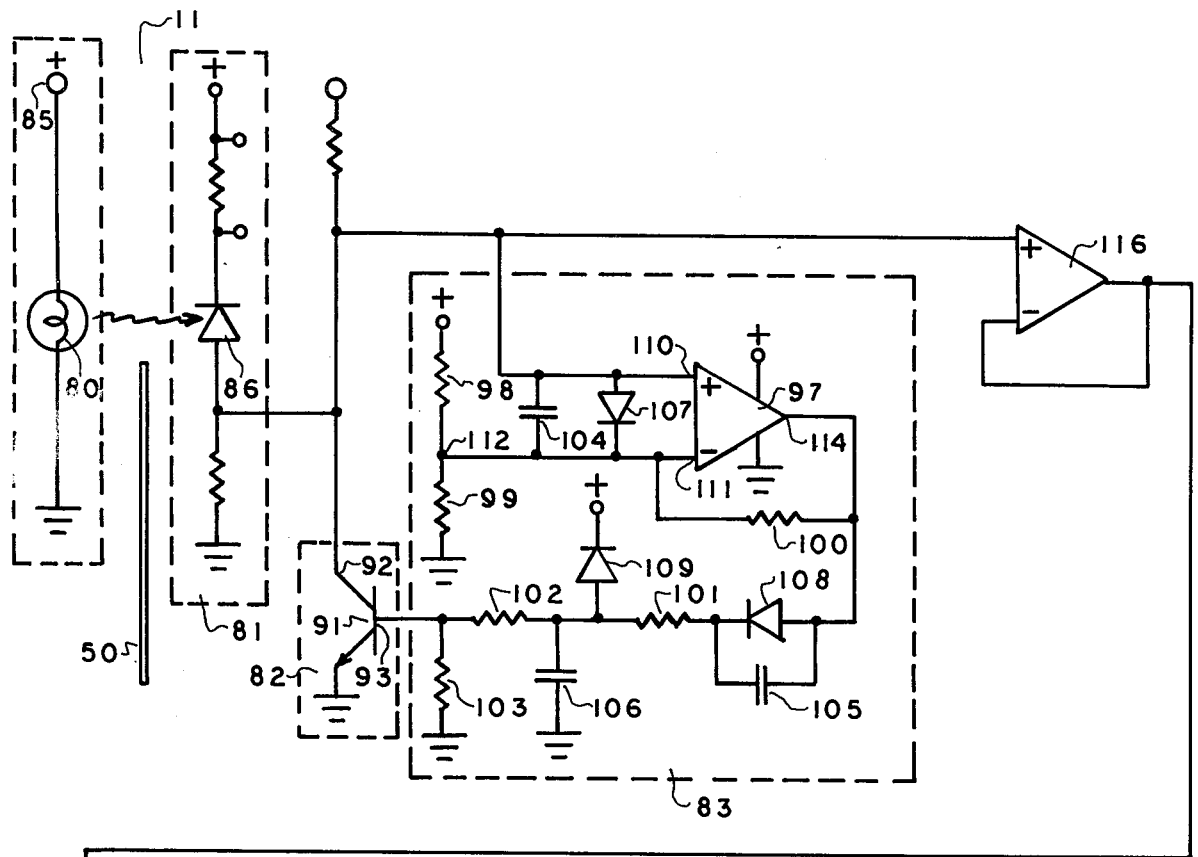
FIG. 3 is a detailed schematic diagram of a document detector which may be utilized in practicing the present invention.
Figure 3:
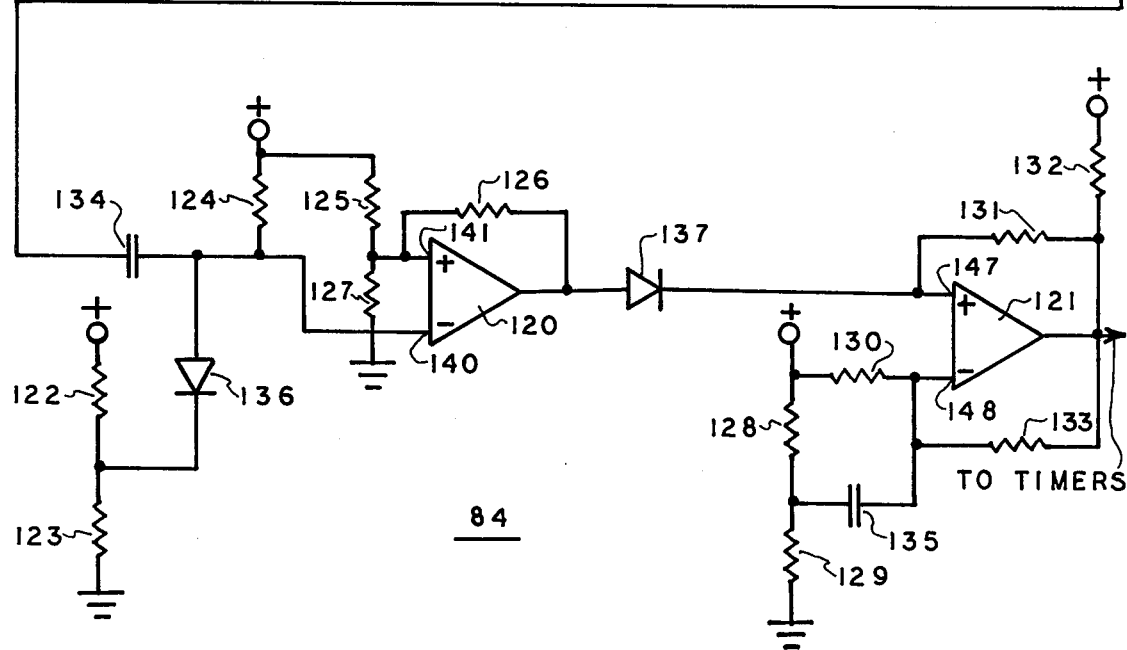

Referring now to FIG. 3, there is shown a schematic circuit diagram of a suitable document detector which may be utilized for practicing the present invention. The document detector of FIG. 3 is fully disclosed and claimed in co-pending application Ser. No. 644,789, filed Dec. 29, 1975, in the name of John Robert Flint, and which is assigned to the assignee of the present invention. For a more complete description of the document detector of FIG. 3, reference may be made to the aforementioned co-pending application.

The document detector comprises a light source 80, a current source 81, a current sink 82, an intermediate control voltage restoring means 83, and a voltage detector 84.

Light source 80 is connected to a suitable power source at terminal 85 and to ground potential to cause light source 80 to iluminate and provide a short term stable light output. The current source 81 includes a light sensitive element comprising a photodiode 86 of a type having a rather large base junction with an effective light sensitive area of approximately one centimeter by two centimeters in dimension. Photodiode 86 is back biased and will provide a current having a magnitude which is directly related to the amount of light which it receives at its effective light sensitive area. Diode 86 is spaced from the light source 80 and arranged for receiving at least a portion of the light source output for providing the current source current. The space between light source 80 and photodiode 86 includes the predetermined path 11. A representative document is shown at 50 prior to passing document detector light source 80 and photodiode 86.

Current sink 82 comprises transistor 91 which has a collector 92 which constitutes the output of the current sink and a base 93 which constitutes the input of the current sink. Collector 92 is coupled to the current source 81 and provides an intermediate control voltage which is related to the magnitude of the current provided by the current source and within a first range within a given level in the presence of a document within the path shielding the photodiode 86 from light source 80 and within a second range above the given level in the absence of a document from the path.

The intermediate control voltage restoring means 83 comprises a negative feedback arrangement coupled between collector 92 of transistor 91 and base 93 of transistor 91. It includes a comparator 97, resistors 98 through 103, capacitors 104 through 106, and diodes 107 through 109. The values of resistors 98 and 99 are selected to provide at junction 112 a reference voltage which is equal to a predetermined level within the second range.

The intermediate control voltage restoring means 83 restores the intermediate control voltage generated at collector 92 of transistor 91 to the predetermined level after each document traverses the path between light source 80 and photodiode 86. The predetermined level may for example be three volts. With input 111 being coupled to the reference voltage and input 110 being coupled to the output of the current sink, the intermediate control voltage restoring means constitutes a negative feedback arrangement to provide at output 114 a restoration voltage for restoring the intermediate control voltage to the predetermined level and which is related to the differential magnitude of the intermediate control voltage and the reference voltage at junction 112. When collector 92 is above the predetermined level of three volts, input 110 will be more positive than input 111 and will cause output 114 to provide a high level which charges capacitor 106 to drive transistor 91 harder to pull collector 92 down to three volts. When collector 92 is below three volts, input 110 will be less positive than input 111 thus resulting in a low voltage at output 114 which causes capacitor 106 to discharge and eventually decreases the drive on base 93 to the point where collector 92 falls back to three volts. The values of resistors 101, 102, and 103 are chosen so that capacitor 106 has a short charging time and a relatively long discharging time. The long discharging time constant for capacitor 106 is selected so that the intermediate control voltabe at collector 92 will be held low within the first range for the entire length of the document as it traverses the path between light source 80 and photodiode 86.

The voltage detector 84 is coupled to the current sink output at collector 92 by unity gain amplifier 116. Unity gain amplifier 116 comprises an impedance matching means for matching the impedance at its input to the impedance of the voltage detector 84.

The voltage detector 84 comprises a comparator 120, resistors 122 through 127, capacitor 134, diodes 136 and 137, and a one-shot multivibrator comprising comparator 121, resistors 128 through 133, and capacitor 135. The values of resistors 125 and 127 are selected to provide at input 141 of comparator 120 a reference voltage which is equal to the given voltage level. When the intermediate control voltage is in a first range below the given voltage, the voltage detector provides responsive thereto a document detection signal which indicates the presence of a document at position A along path 11. The document detection signal is utilized for activating the first and second counters associated with the first and second sample and hold circuits. The given voltage level may be selected to be 2.5 volts.

Comparator 121 and its associated circuitry forms a one-shot multivibrator. Comparator 121 has an input 147 coupled to output 146 of comparator 120 by diode 137. Comparator 121 has another input 148 coupled to resistors 130 and 133, and capacitor 135. Resistor 130 is coupled to a positive power source terminal and to resistor 128. Resistor 128 is coupled to ground by resistor 129 and capacitor 135 is coupled to the common junction of resistors 128 and 129. This arrangement establishes at input 148 a reference voltage for use by the one-shot multivibrator and also a means for resetting the one-shot. Output 150 provides the document detection signal which may be used by the first and second timers as indicated.

The document detector operates as follows. Assuming that there are no documents in the path between light source 80 and photodiode 86, the negative feedback arrangement of the intermediate control voltage restoring means 83 establishes collector 92 of current sink 82 at a predetermined level of three volts within the second range above the given voltage level of 2.5 volts. At this time, diode 86 is receiving the maximum amount of available light from light source 80 and is conducting its maximum current. Thus, the intermediate control voltage restoring means adjusts the intermediate control voltage to the light available at diode 86.

When the leading edge of document 50 shields photodiode 86 from light source 80, the current supplied by photodiode 86 and thus the current source 81 is drastically reduced which causes the voltage level at collector 92 of current sink transistor 91 to approach zero. Thus, the intermediate control voltage decreases from the predetermined level of three volts to approximately zero which is detected by voltage detector 84. Voltage detector 84 receives at input 140 of comparator 120 the intermediate control voltage which is now approximately zero and compares this voltage against the given level of 2.5 volts which is impressed upon input 141. Because input 141 is now more positive than input 140, comparator 120 will provide at output 146 a high level which is transferred to input 147 of comparator 121. Output 147 will likewise be more positive than input 148 so that comparator 121 will provide at output 150 a high level constituting the document detection signal to be translated to the first and second timers.

While the document is traversing the path between light source 80 and photodiode 86, the intermediate control voltage is held down over the entire length of the document within the first range and the given level because capacitor 106 provides discharge current drive to base 93 of transistor 91. When the end of the document finally traverses and exits the path between light source 80 and photodiode 86 photodiode 86 once again conducts current. Because capacitor 106 is at least partially discharged, the collector 92 of transistor 91 will rise to a level above the predetermined level of three volts. When this happens, the negative feedback arrangement of the intermediate control voltage restoring means causes capacitor 106 to be quickly charged to drive base 93 harder to reduce the voltage at collector 92 to the predetermined level of three volts. Because of the fast charging time constant for capacitor 106 the intermediate control voltage at collector 92 will be pulled down to the predetermined level within a relatively short period of time. In fact, the intermediate control voltage will be restored to the predetermined level of three volts before the next document shields photodiode 86 from light sourse 80.

Now, the light source and photodiode 86 are in between documents, and the intermediate control voltage is restored to the predetermined level of three volts which is in the second range above the given level. Input 141 of comparator 120 will be less positive than input 140 and thus will provide a low level output 146. Capacitor 135 and is associated resistors 130, 128, and 129 for reset the one-shot multivibrator comprising comparator 121 for acting upon the next document.

Figure 4:
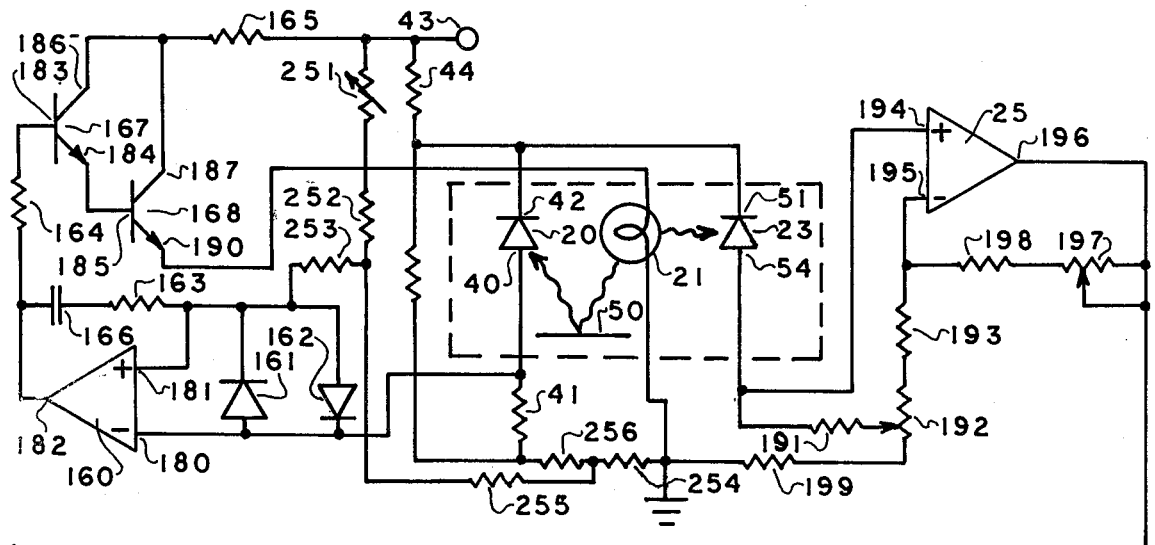
FIG. 4 is a more detailed schematic circuit diagram of a portion of an automatic exposure control embodying the present invention.
Figure 4:
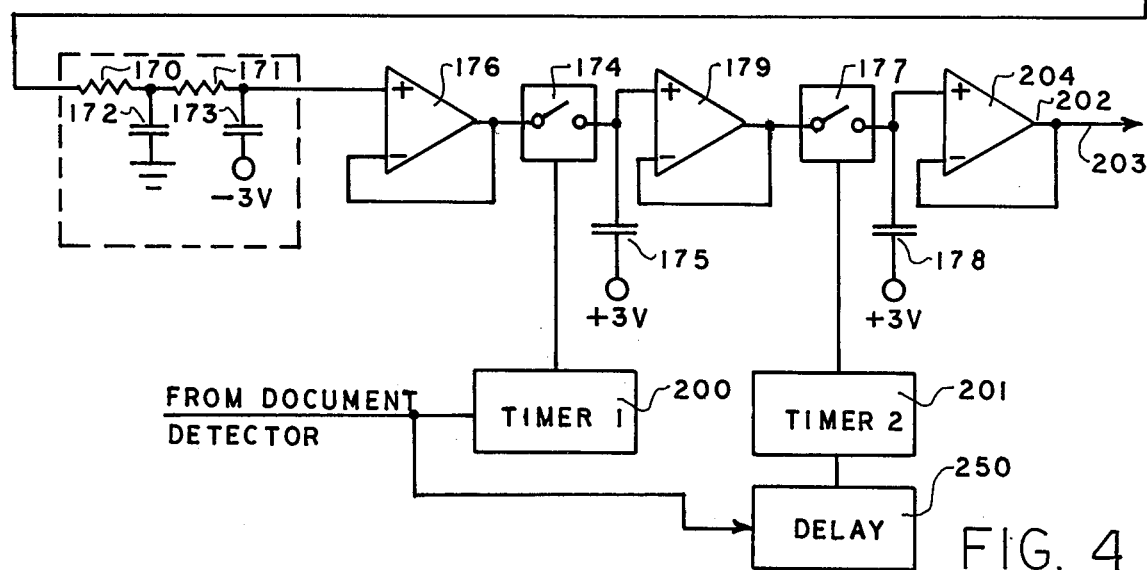

FIG. 4 shows a more detailed representation of the exposure level sensor, the feedback arrangement, the averaging means, and the first and second sample and hold circuits with their associated first and second timers. The circuit of FIG. 4 comprises the exposure level sensor including the first photodiode 20, the first light source 21, and the second photodiode 23. The feed back arrangement comprises comparator 160, diodes 161 and 162, resistors 163, 164 and 165, capacitor 166, and Darlington pair transistors 167 and 168. The averaging means 24 comprises amplifier 25 and an integrating circuit comprising resistors 170 and 171 and capacitors 172 and 173. The first sample and hold circuit comprises switch 174 and capacitor 175. The first sample and hold circuit is coupled to the integrating circuit by amplifier 176. The second sample and hold circuit comprises switch 177 and capacitor 178. The second sample and hold circuit is coupled to the first sample and hold circuit by amplifier 179.

The first photodiode 20 is coupled to the positive power terminal 43 by resistor 44 and to ground by resistor 41 to back bias the first photodiode 20. As previously explained, the first photodiode is arranged relative to the first light source 21 and to the predetermined path in which document 50 lies to receive light reflected from the document which originated from light source 21. Photodiode 20 therefore provides at anode 40 a first control signal having a magnitude directly related to the reflected intensity of light source 21. Anode 40 is coupled to the negative input 180 of comparator 160. Comparator 160 has another input 181 having diodes 161 and 162 coupled across inputs 181 and 180 and input 181 is also coupled to output 182 by the series combination of resistor 163 and capacitor 166. Variable resistor 251, and fixed resistors 252-256 are connected as shown to provide a reference voltage at input 181. The reference voltage is calibrated by the appropriate setting of variable resistor 251. Output 182 of comparator 160 is coupled to base 183 of transistor 167 by resistor 164. Emitter 184 of transistor 167 is coupled to the base 185 of transistor 168. The collectors 186 and 187 of transistors 167 and 168 respectively are coupled together and to the positive power terminal 43 by resistor 165. The output of the Darlington pair, emitter 190 is coupled to the first light source 21.

Because the anode 40 is coupled to the negative input 180 of comparator 160, comparator 160 in conjunction with the Darlington pair forms a negative feedback arrangement which controls the light output intensity of light source 21 such that the reflected light received by photodiode 20 is substantially constant. When a document of low density or high reflective properties immediately follows a document of low reflective properties, diode 20 receives an increased amount of light which will cause the first control signal at anode 40 to increase in magnitude. The increase in magnitude of the first control signal will cause a corresponding decrease in the magnitude in the output of output 182 which is conveyed through the Darlington pair transistors to light source 21 to provide less illumination power to light source 21 to dim light source 21. In this manner, the reflected light received by diode 20 is maintained substantially constant.

The light output of light source 21 is detected by photodiode 23. Photodiode 23 has an anode 54 coupled to ground by the combination of resistors 191, 192 and 199 and a cathode connected to the positive power terminal 43 by resistor 44 to thereby back bias diode 23. Diode 23 therefore provides a second control signal at anode 54 which is directly related in magnitude to the light output intensity of light source 21. Anode 54 of diode 23 is coupled to input 194 of amplifier 25. Amplifier 25 has another input 195 coupled to ground via resistor 193, 192, and 199. Amplifier 25 has an output 196 coupled to input 195 via the resistor combinations of 197 and 198. Amplifier 25 amplifies the second control signal by a known factor which is integrated by the integrating circuit comprising resistors 170, 171 and capacitors 172, 173. The averaging means therefore provides at the common junction of resistor 171 and capacitor 173 the third control signal which is impressed upon amplifier 176.

After the exposure level sensor has sensed a sufficient portion of the document and has provided the third control signal at the output of the averaging means, the document detector will provide a document detection signal (at position A) in a manner as previously explained to activate the first timer 200 which then closes switch 174 to transfer the third control signal to the first sample and hold circuit capacitor 175. After a finite time period, capacitor 175 will be charged to the third control signal level and switch 174 will be closed by the first timer 200. At this point in time the document has reached position B on the predetermined path 11 as shown in FIG. 1.

At the end of the first predetermined time period following the document control signal, when the document is at position C, timer 201 is activated by delay 250 and will close the switch 177 of the second sample and hold circuit with a second transfer signal to cause the third control signal to be transferred from capacitor 175 through amplifier 179 and into capacitor 178 of the second sample and hold circuit. The level of the third control signal is fully stored in capacitor 178 at the end of the second predetermined time period and is made available to amplifier 204 and appears at output 202 and line 203. At this point in time, the document has reached position D along the predetermined path as shown in FIG. 1 and the immediately preceding document has fully exited the exposure station.

Figure 5:
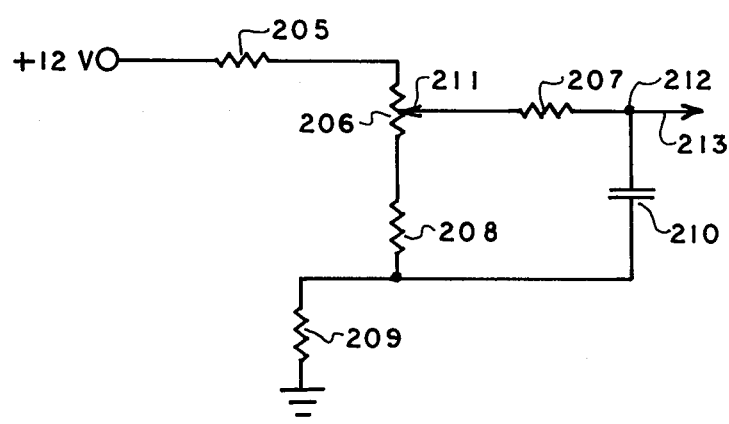
FIG. 5 is a schematic circuit diagram of a circuit which may be utilized in practicing the present invention when operating the exposure control in a manual mode.

The circuit of FIG. 4 is utilized for automatic exposure control. The circuit of FIG. 5 is utilized for manual control of the exposure level. Referring now to FIG. 5, it comprises resistors 205 through 209 and capacitor 210. The resistors are coupled together in a well known manner so that as wiper 211 of resistor 206 is varied, a varying DC output is provided at output 212 and on line 213.

Line 203 is connected to terminal 220 of switch 221 (FIG. 6) and line 213 coupled to output 212 is connected to terminal 222 of switch 221. Switch 221 selectively connects either line 203 or line 213 to input 68 of comparator 34 as shown in FIG. 6.

Figure 6:
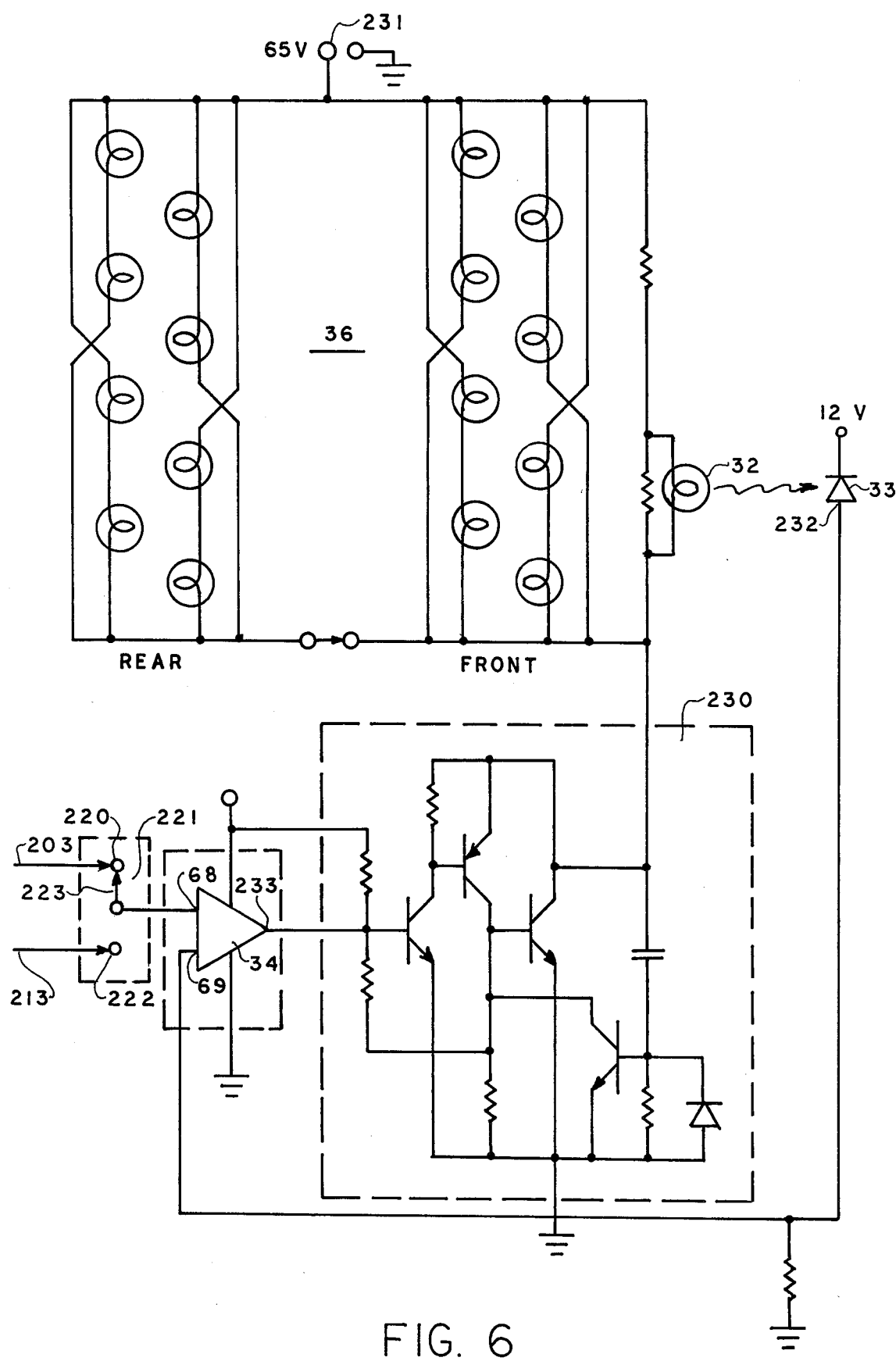
FIG. 6 is a schematic circuit diagram showing an exposure light source and associated power supply in accordance with the present invention.

FIG. 6 shows the comparator and the variable voltage power source in detail. When switch 221 is in the position shown, the system is operational in the automatic mode. When wiper 223 contacts terminal 222, the system is operative in the manual mode. The exposure light source is shown generally at 36 and comprises a plurality of incandescent lamp. The circuit generally designated 230 comprises a switching means which is connected in series with the exposure light source between the positive power terminal 231 and ground. For a full and complete description of the switching means 230 and its operation relative to the comparator 34, exposure light source 36, and the circuit of FIG. 5, reference may be made to co-pending application Ser. No. 617,720, now abandoned, filed on Sept. 30, 1975 in the name of John Robert Flint which is assigned to the assignee of the present invention.

Monitoring light source 32 is coupled to the exposure light source such that its output intensity is directly related to the light output intensity of the exposure light source 36. Monitor photodiode 33 is arranged relative to light source 32 to receive its light output and provides at its anode 232 the fourth control signal having a magnitude directly related to the light output intensity of monitoring light 32 and therefore the output intensity of the exposure lamp bank 36. Anode 232 of diode 33 is coupled to input 69 of comparator 34. Comparator 34 compares the third control signal at input 68 to the fourth control signal at input 69 to control the switching means 230 so that the light output intensity of the lamp bank 36 is adjusted to the proper illumination intensity. When the third control signal at input 68 is more positive than the fourth control signal at input 69, this indicates that the lamp bank must be made brighter to properly expose the document. In response to this condition, comparator 34 will provide a difference signal at output 233 to cause switching means 230 to stay on for longer periods of time to provide increased illumination power to the exposure lamp bank 36. Conversely, when the third control signal at input 68 is less positive than the fourth control signal at input 69, comparator 34 will provide at output 233 a difference signal which causes the switching means 230 to be on for shorter periods of time to decrease the illumination power to the exposure lamp bank to cause the exposure lamp bank to dim and thus assume the proper illumination intensity for exposing the document.

In its preferred form, all of the light sources including the exposure lamp bank, the first light source, and the monitoring light source, should be of the same type, and preferably incandescent lamps. In this way, it is known that each of the light sources will react to applied illumination power in the same manner to assure exact control of the illumination intensity of the exposure lamp bank 36.

While particular embodiments of the invention have been shown and described, modifications may be made and it is intended in the appended claims to cover all such modifications that may fall within the true spirit and scope of the invention.

We claim:

1. In a document recorder of the type having a document transport for feeding documents along a predetermined path, an exposure station within the predetermined path and including an exposure light source for illuminating each document as each document is presented to the exposure station to facilitate the photographing of the documents, an automatic exposure control system for controlling the illumination intensity of the exposure light source to assure proper exposure of each document comprising:

a first light source arranged relative to the predetermined path for projecting light onto the documents to be recorded;

a first light sensitive element arranged relative to the predetermined path for receiving the light reflected from the documents originating from said first light source, said first light sensitive element providing a first control signal having a magnitude directly related to the intensity of said reflected light;

a feedback arrangement coupled between said first light sensitive element and said first light source for controlling the light output intensity of said first light source responsive to said first control signal to render the intensity of the reflected light received by said first light sensitive element substantially constant; and control means coupled between said first light source and the exposure light source for controlling the illumination intensity of the exposure light source in direct relation to the light output intensity of said first light source, said control means comprising a second light sensive element arranged relative to said first light source for receiving the light output of said first light source, said second light sensitive element providing a second control signal having a magnitude directly related to the light output intensity of said first light source and averaging means coupled to said second light sensitive element for averaging said second control signal to thereby provide a third control signal, and means responsive to said third control signal for controlling the illumination intensity of the exposure light source.

2. An automatic exposure control system in accordance with claim 1 wherein said first light sensitive element comprises a photodiode.

3. An automatic exposure control system in accordance with claim 1 wherein said feedback arrangement comprises a comparator having an inverting input and an output and a Darlington transistor pair having an input and an output, said inverting input being coupled to said first light sensitive element, said comparator output being coupled to said Darlington pair input, and said Darlington pair output being coupled to said first light source.

4. An automatic exposure control in accordance with claim 1 wherein said second light sensitive element comprises a photodiode.

5. An automatic exposure control system in accordance with claim 1 wherein said averaging means comprises an integrating network.

6. An automatic exposure control system in accordance with claim 1 wherein said control means further comprises a monitor light source coupled to the exposure light source for providing a light output having an intensity directly related to the illumination intensity of the exposure light source, a monitor light sensitive element arranged relative to said monitor light source for receiving said monitor light source output for providing a fourth control signal having a magnitude directly related to said monitor light source light output intensity and means responsive to said third and fourth control signals for controlling the illumination intensity of the exposure light source.

7. An automatic exposure control system in accordance with claim 6 wherein said monitor light source and said first light source are of the same type of light source as the exposure light source.

8. An automatic exposure control system in accordance with claim 6 wherein said monitor light sensitive element comprises a photodiode.

9. An automatic exposure control system in accordance with claim 6 wherein said means responsive to said third and fourth control signal comprises comparing means coupled to said averaging means and to said monitoring light sensitive element for receiving said third and fourth control signals and for providing a difference signal responsive to the difference in magnitude of said third and fourth control signals, and a variable voltage power source coupled to the exposure light source and to said comparing means for providing illumination power to the exposure light source in an amount directly related to said difference signal.

10. An automatic exposure control system in accordance with claim 9 wherein said comparing means comprises a comparator having a first input, a second input, and an output, said first input being coupled to said averaging means, said second input being coupled to said monitor light sensitive element and wherein said difference signal is provided at said comparator output.

11. An automatic exposure control system in accordance with claim 9 wherein said first light source, said first light sensitive element, and said feedback arrangement comprise an exposure level sensor, said exposure level sensor being spaced from the exposure station along the predetermined path in advance of the exposure station relative to the document feed direction, and wherein said automatic exposure level control system further comprises a document detector positioned in between the exposure station and said exposure level sensor along the predetermined path for detecting the presence of each document after the exposure level of at least a portion of each document has been sensed and for providing a document detection signal responsive to said detection, and delay means coupling said averaging means to said comparing means and coupled to said document detector, said delay means being responsive to said document detection signal for delaying the application of the third control signal associated with each document to said comparing means until each preceding document has exited the exposure station.

12. An automatic exposure control system in accordance with claim 11 wherein said delay means comprises:

a first sample and hold circuit coupled to said averaging means;

a second sample and hold circuit coupled to said first sample and hold circuit and to said comparator means;

a first timer coupled to said first sample and hold circuit and to said document detector for providing said first sample and hold circuit with a first transfer signal responsive to said document detection signal to thereby cause said third control signal to be transferred from said averaging means to said first sample and hold circuit when each document reaches a first position along the predetermined path past said document detector; and a second timer coupled to said second sample and hold circuit and to said document detector for providing said second sample and hold circuit with a second transfer signal at the end of a first predetermined time period following said document detecting signal to thereby cause said first sample and hold circuit to transfer said third control signal to said second sample and hold circuit to thereby make said third control signal available to said comparator means when each document reaches the exposure station.

13. In a document recorder of the type having a document transport for feeding documents along a predetermined path, an exposure station within the predetermined path and including an exposure light source for illuminating each document as each document is presented to the exposure station to facilitate the photographing of the documents, an automatic exposure control system for controlling the illumination intensity of the exposure light source to assure proper exposure of each document comprising:

a first light source arranged relative to the predetermined path for projecting light onto the documents to be recorded;

a first light sensitive element arranged relative to the predetermined path for receiving the light reflected from the documents originating from said first light source, said first light sensitive element providing a first control signal having a magnitude directly related to the intensity of said reflected light;

a feed back arrangement coupled between said light sensitive element and said first light source for controlling the light output intensity of said first light source responsive to said first control signal to render the intensity of the reflected light received by said first light sensitive element substantially constant; a second light sensitive element arranged relative to said first light source for receiving the light output of said first light source, said second light sensitive element providing a second control signal having a magnitude directly related to the light output intensity of said first light source;

averaging means coupled to said second light sensitive element for averaging said second control signal to thereby provide a third control signal;

a monitor light source coupled to the exposure light source for providing a light output having an intensity directly related to the illumination intensity of the exposure light source;

a monitor light sensitive element arranged relative to said monitor light source for receiving said monitor light source light output for providing a fourth control signal having a magnitude directly related to the intensity of said monitor light source light output;

comparing means coupled to said averaging means and to said monitoring light sensitive element for receiving said third and fourth control signals and for providing a difference signal responsive to the difference in magnitude of said third and fourth control signals; and a variable voltage power source coupled to the exposure light source and to said comparing means for providing illumination power to the exposure light source in an amount directly related to said difference signal.

* * * * *